United States Patent Office 2,700,655
Patented Jan. 25, 1955

2,700,655

RUBBER COMPOSITIONS

Herbert A. Endres, Cuyahoga Falls, James W. Shaw, Jr., Akron, Ohio, and Harold B. Pullar, Magnolia, Ark., assignors to Wingfoot Corporation, Akron, Ohio, a corporation of Delaware No Drawing. Application September 28, 1951,
Serial No. 248,886

11 Claims. (Cl. 260—28.5)

This invention relates to a rubber-like composition and is more particularly directed to a material comprising a rubber and a filler combined, and to a process for preparing the composition.

It is known that rubber block cushioning of road surfaces has many advantages, e. g., it not only gives more resiliency but also tends to increase substantially the life of the pavement. More recently it has been discovered that a small percentage of rubber can be added to improve the customary asphalt pavement. This has been accomplished by sifting vulcanized rubber particles into a hot asphalt aggregate composition while it is being mixed in a pug mill. The rubber thus compounded has a tendency to swell and absorb the lower boiling constituents of the hot asphalt. The road surface thus prepared is less susceptible to temperature changes which, in turn, decreases cracking during freezing weather. In this manner a serious defect in asphalt paving is alleviated. It has also been discovered that latex rubber can be used for this purpose directly with hot asphalt or in an asphalt emulsion.

However, these methods of incorporating rubber in asphalt paving compositions are not satisfactory. Thus, addition of the rubber in the form of latex is subject to the disadvantage that the composition must be mixed until all the water is driven off. Also, this process is objectionable because the mixture of rubber latex and hot asphalt tends to foam. This prevents proper mixing and creates a handling problem. On the other hand, if the rubber is added in the form of vulcanized ground rubber particles, it is free-flowing but resists penetration by the asphalt. Less highly vulcanized rubber is not free-flowing and is hard to handle. Unvulcanized rubber is open to the objection that it is difficult to process. Also, it tends to coalesce and block during storage. Therefore, prior to this invention no completely satisfactory method of incorporating free-flowing raw rubber in a road surface has been devised.

Since the cost of rubber, as compared to the cost of asphalt, prohibits a large percent of rubber from being used for road purposes, it is a prime consideration to prepare a composition which will be cheap enough to allow its use in road construction. Such compositions, while described herein primarily for use in building roads, may also be employed in other connections.

It is, therefore, an object of this invention to provide a free-flowing rubber-filler composition. It is another object of this invention to provide a composition of rubber and filler which can be mixed directly with asphalt. Still another object of this invention is to produce a composition with particles of rubber and particles of filler closely united or associated. It is a further object of this invention to prepare a composition of rubber and filler in powdered form. An additional object of this invention is to provide a method of preparing a rubber composition by coprecipitating rubber from latex with a slurried filler in a liquid medium. Other objects will be apparent as the description proceeds.

In the practice of this invention a water suspension of a filler is mixed with rubber latex and then co-precipitated by means of a coagulant. The coagulated compound is filtered from the slurry, dried and pulverized. The product is inexpensive, easy to handle because it is free-flowing, and readily disperses in hot asphalt.

Almost any type of inert material, especially finely ground minerals, can be used as a filler. Thus, perlite, fly ash, ground quartz, clay, diatomaceous earth, soapstone, bentonite, ground limestone, carbon black and barytes are satisfactory for this purpose, barytes being preferred. The filler, in an amount of about 5 to 30 parts by weight, can be slurried with about 95 to 70 parts by weight of water. The pH of the slurry is adjusted to about 8.0 to 9.5 to prevent premature coagulation of the rubber. To this slurry about 2 to 12 parts by weight of 30% rubber latex is added. An equivalent amount of rubber solids from other latices of various rubber concentration may be used. The slurry of rubber latex and filler is agitated until a homogeneous mixture is obtained.

It has been found that any type of latex rubber is operable in the practice of this invention. Natural rubber latices, butadiene-styrene latices, i. e., GR-S latices, polybutadiene latices, butadiene-acrylonitrile latices and polyisoprene latices are representative examples. It is preferred to use GR-S types I or II latex containing about 26–28% by weight of rubber. These are latices of butadiene-styrene 70:30 copolymers. Type I contains the anti-oxidant phenyl beta naphthylamine to the amount of about 1½% by weight based on the dry rubber content. Such a rubber can be processed at a higher temperature than is possible with GR-S Type II latex which does not contain an anti-oxidant.

After the latex-filler slurry has been thoroughly mixed, a coagulant is added to precipitate the solids from the mixture. Representative coagulants are aluminum sulphate, sodium chloride, barium chloride, calcium chloride, magnesium sulphate, hydrochloric acid and sulphuric acid.

The rubber-filler composition comes out of suspension with each coagulated particle of rubber coated with many particles of filler. Although the particle size of the rubber can be varied within limits it is preferred to coagulate the rubber and filler as particles of about 100 to 200 microns in diameter. We have found that particle size and distribution are important elements in road surfacing because a mixing cycle as short as one and one-half minutes requires a maximum surface area in order to obtain absorption of the asphalt constituents. This gives, as a final product, particles which will pass through a 60-mesh standard screen. The particle size of the filler can range from less than 1 to about 40 microns depending on the type of filler being used. Thus, the rubber is obtained in the form of non-tacky particles because each particle is coated with the smaller particles of the filler which is non-tacky. The resulting rubber-filler particles can be subsequently de-watered, dried and pulverized to break up aggregates and produce a fine free-flowing powder for ready use in asphalt applications.

The final rubber-filler product may contain from about 10 to 50 percent by weight of rubber and from about 90 to 50 percent by weight of filler. In the practice of this invention we have found that a dry pulverized composition containing 11.3% by weight of rubber and 88.7% by weight of filler gives very satisfactory results.

The dry rubber-filler composition can be mixed with dry powdered asphalt in an amount of about 40 to 60% by weight of rubber-filler composition to about 60 to 40% by weight of powdered asphalt. This material can be mixed in the usual manner with hot asphalt aggregate and a flux oil and used in the construction of road surfaces. The rubber-filler compound can be mixed directly with hot asphalt if desired, omitting the powdered asphalt.

Although the invention has been described with respect to road building compositions, it is to be understood that it can be used for any purpose where asphalt is normally used. Representative examples of such uses for the product of this invention are in the production of roofing paints, roofing papers, under-coatings for autos and trucks, bonding materials for irrigation ditches, asphalt siding, shingles, floor tile, joint fillers for concrete roads and in erosion control.

The following representative examples are for the purpose of illustrating the invention and are not intended as limitations thereof.

*Example 1*

Barytes was obtained from the National Lead Company in the form of a slurry which is the waste by-product effluent obtained in the purification of the crude mineral. The pH of the slurry was adjusted from 4.5 to about 9 with sodium hydroxide. This was necessary to prevent coagulation of the latex to be mixed therewith before a uniform blending of the two liquids is obtained. About 510 pounds of GR-S type II rubber in the form of a 30% by weight rubber latex was added to about 4000 pounds of barytes in slurry form and the slurried mixture was agitated to assure thorough blending. To the slurried rubber-barytes suspension about 2 pounds of aluminum sulphate was added in the form of a ½% by weight water solution. This caused coagulation of the rubber which came down with particles of barytes adhered to the particles of rubber. The final rubber-filler particles were obtained in an extremely uniform size and with a uniform rubber composition.

Microscopic studies showed that the barytes particles ranged from about 1.0 to 25 microns in diameter and that they were crystalline in nature. The coagulated rubber particles ranged from about 100 to 200 microns in diameter and would just pass through a 60-mesh standard screen. The studies also showed that the product of the invention was actually made up of fine particles of coagulated rubber with smaller particles of barytes attached to the rubber, thus constituting a non-tacky, free-flowing material.

Coagulation is effected, as mentioned, by adding to the slurry of rubber latex and barytes the coagulant, i. e., aluminum sulphate, the particle size of the rubber being controlled by regulating the pH of the slurry, the concentration of the coagulant and the rate of addition thereof to the slurry. Finer particle size is obtained by increasing the pH of the slurry in the direction of greater basicity, by decreasing the concentration of the coagulating solution, by the use of additives such as sodium ligno sulphonate, and by decreasing the rate at which the coagulant is added to the slurry.

The rubber barytes composition was next passed through a filter press and blown with air for about 30 minutes. This reduced the water content of the cake down to about 25 to 30%. The filtered cake was extruded through a small rod-forming extruder and the resultant rods were dried in tray driers to less than 0.5% moisture. This was accomplished by drying for 4 hours at a temperature of 190° F. The dry rods were next pulverized to less than 35-mesh by means of a micro pulverizer to give a final product composed of 11.3% rubber and 88.7% barytes.

The dry rubber-barytes material was mixed with powdered asphalt to provide a road-building component comprising 47% powdered asphalt, 47% barytes and 6% rubber. This product was used as a building material in the preparation and installation of a hot asphalt road test strip. The product of the invention was free-flowing, easily handled, and low cost, a definite advance in the art of road building.

Although the composition of the foregoing example was prepared on a masterbatch basis, it will be apparent that a continuous production process is practical. Also it will be understood that the particle size of the rubber can be controlled by adjusting the conditions under which coagulation is effected as hereinabove set forth.

*Example 2*

The following rubber-filler composition was prepared on a laboratory basis in accordance with the following formula:

GR-S type I latex (30% rubber)_____ 200 ml. (60 grams rubber)
Soapstone slurry (50% solids)_____ 90 ml. (45 grams soapstone)
Water _____ 90 ml.

The soapstone slurry was blended with latex and then coagulated by the addition of a 0.5% solution of aluminum sulphate and sodium chloride.

A fine-particle crumb was obtained which remained free-flowing and passed through an 8-mesh standard screen. This powder contained 57 parts rubber and 43 parts soapstone.

*Example 3*

A laboratory sample of rubber-limestone containing the following ingredients was prepared.

Grams
Powdered limestone slurried in 2 liters of water____ 150
Rubber in 180 grams of latex_____ 50

The rubber and limestone were mixed in a slurry and coagulated by aluminum sulphate. This gave a final powdered product which was free-flowing and which contained 25% rubber and 75% limestone.

*Example 4*

A rubber-barytes composition containing the following ingredients was prepared as in the above examples:

Grams
Natural rubber latex (30% by weight of rubber)____ 185
Barytes in 1,000 ml. of water_____ 391

The latex and barytes were mixed together and coagulated by means of 20 grams of sodium chloride and 5 grams of aluminum sulphate. The rubber with barytes attached coagulated very readily and gave a small particle size on drying. The final pulverized product was capable of passing through a 35-mesh standard screen and was free-flowing.

In this specification and the appended claims the term "latex rubber" as used therein is intended to include natural rubber latices, butadiene-styrene latices, e. g., GR-S latices, polybutadiene latices, butadiene-acrylonitrile latices and polyisoprene latices.

While certain representative embodiments and details have been shown for the purpose of illustrating the invention, it will be apparent to those skilled in this art that various changes and modifications may be made therein without departing from the spirit or scope of the invention.

We claim:

1. A method of uniformly distributing an unvulcanized rubber in asphalt which comprises mixing said asphalt with a free-flowing rubber-containing powder which acts as a vehicle for incorporating said rubber in said asphalt, said free-flowing powder containing from 10% to 50% by weight of rubber and from 90% to 50% by weight of a mineral carrier and being capable of passing through a 60-mesh standard screen.

2. A method of adding an unvulcanized rubber to asphalt which comprises mixing said asphalt with particles of a free-flowing rubber-containing powder, said particles ranging in size from about 100 to 200 microns and containing a mineral pigment and a rubbery copolymer of butadiene and styrene said pigment and copolymer of butadiene and styrene being present in a relationship of about 90% to 50% by weight of pigment to about 10% to 50% by weight of copolymer of butadiene and styrene.

3. A mixture of an asphalt and a free-flowing powder, said free-flowing powder being capable of passing through a 60-mesh standard screen and being comprised of an unvulcanized rubber and a mineral pigment selected from the group consisting of perlite, fly-ash, ground quartz, carbon black, soapstone, limestone and barytes and containing from 10 to 50% of unvulcanized rubber by weight of said powder.

4. A composition of an asphalt and a free-flowing readily dispersible powder comprising about 60% by weight to about 40% by weight of asphalt and about 40% by weight to about 60% by weight of a free-flowing readily dispersible powder, said powder being comprised of about 10% by weight to about 50% by weight of an unvulcanized rubber and about 90% by weight to about 50% by weight of a finely divided mineral selected from the group consisting of perlite, fly-ash, ground quartz, carbon black, soapstone, limestone and barytes and capable of passing through a 60-mesh standard screen.

5. A method of surfacing an asphalt road comprising preparing a composition of an asphalt and a free-flowing readily dispersible powder capable of passing through a 60-mesh standard screen and comprising about 60% by weight to about 40% by weight of asphalt and about 40% by weight to about 60% by weight of a free-flowing readily dispersible powder, said powder comprising about 10% by weight to about 50% by weight of an unvulcanized rubber and about 90% by weight to about 50% by weight of a finely divided mineral, mixing said composition of asphalt and free-flowing readily dispersible powder with an asphalt aggregate and spreading the resulting mixture on a road base.

6. A road surface comprising an asphalt, an asphalt road aggregate, and a free-flowing rubber-mineral additive powder, said free-flowing rubber-mineral additive powder containing from 10 to 50% by weight of an unvulcanized rubber and from 90 to 50% by weight of a mineral filler, said free-flowing rubber-mineral additive powder being capable of passing through a 60-mesh standard screen and being present in said road surface in less quantity than said asphalt.

7. A road surface comprising an asphalt, an asphalt road aggregate, and a free-flowing rubber-mineral additive powder, said free-flowing rubber-mineral additive powder containing from 10 to 50% by weight of a copolymer of butadiene and styrene wherein the butadiene content ranges from about 70% to 100% by weight and from 90 to 50% by weight of a mineral filler, said free-flowing rubber-mineral additive powder being capable of passing through a 60-mesh standard screen and being present in said road surface in less quantity than said asphalt.

8. A method of preparing an asphalt surfacing composition comprising the steps of (1) preparing a storage-stable free-flowing powder capable of passing through a 60-mesh standard screen and capable of dispersing readily in asphalt from a mixture of an unvulcanized rubber and a mineral pigment, said unvulcanized rubber being present in an amount of 10% to 50% by weight and the mineral pigment being present in an amount of 90% to 50% by weight of the powder, and (2) mixing said storage-stable free-flowing finely divided powder with asphalt to form said asphalt surfacing composition.

9. A method of preparing an asphalt surfacing composition comprising the steps of preparing a free-flowing powder capable of dispersing readily in asphalt and capable of passing through a 60-mesh standard screen containing from 10% to 50% by weight of unvulcanized rubber and from 90% to 50% by weight of a mineral filler, by the simultaneous coagulation of an unvulcanized rubber from a rubber latex and the removal of water from a water slurry of a mineral pigment, drying the same and mixing the said free-flowing powder with asphalt.

10. A method of preparing an asphalt surfacing composition comprising the steps of preparing a free-flowing powder, capable of dispersing readily in asphalt and capable of passing through a 60-mesh standard screen and containing from 10% to 50% by weight of an unvulcanized rubber and from 90% to 50% by weight of a mineral filler, by mixing a rubber latex in an aqueous suspension of a finely divided mineral, simultaneously coprecipitating the rubber and finely divided mineral as particles capable of passing through a 60-mesh standard screen, drying the same and mixing the said free-flowing powder with powdered asphalt, and blending said mixture with a hot asphalt aggregate and a flux oil.

11. A free-flowing powder capable of passing through at least a 20-mesh standard screen, composed of 6 percent powdered rubber, 47 percent powdered asphalt and 47 percent of barytes filler particles capable of passing through a 325-mesh standard sieve.

References Cited in the file of this patent

UNITED STATES PATENTS

| 1,991,367 | Beck | Feb. 19, 1935 |
| 2,454,506 | Fischer | Nov. 23, 1948 |
| 2,560,043 | Schmidt | July 10, 1951 |

FOREIGN PATENTS

| 505,502 | Great Britain | May 11, 1939 |

OTHER REFERENCES

"Asphalt Rubber Mixtures in Road Building," I. R. I. Transaction, 15 (1939), page 24.
Roads and Streets, (December 1948), page 82.
O'Connor, Rubber Age, 54, 423–427 (February 1944).
Schmidt, Ind. Eng. Chem. 43, 679–683 (March 1951).